(12) United States Patent
Tannis et al.

(10) Patent No.: US 10,051,836 B1
(45) Date of Patent: Aug. 21, 2018

(54) DOG-WASHING APPARATUS

(71) Applicants: Stephen Tannis, Roxbury, MA (US);
Lila Tannis, Roxbury, MA (US)

(72) Inventors: Stephen Tannis, Roxbury, MA (US);
Lila Tannis, Roxbury, MA (US)

( * ) Notice: Subject to any disclaimer, the term of this patent is extended or adjusted under 35 U.S.C. 154(b) by 127 days.

(21) Appl. No.: 14/969,081

(22) Filed: Dec. 15, 2015

(51) Int. Cl.
*A01K 13/00* (2006.01)
*A01K 29/00* (2006.01)

(52) U.S. Cl.
CPC .......... *A01K 13/001* (2013.01); *A01K 29/00* (2013.01)

(58) Field of Classification Search
CPC ....... A01K 13/001; A01K 13/00; A01K 29/00
USPC .......................................... 119/671
See application file for complete search history.

(56) References Cited

U.S. PATENT DOCUMENTS

| | | | | |
|---|---|---|---|---|
| 1,760,017 A | * | 5/1930 | Smoot | A01K 13/001 119/671 |
| 3,884,191 A | | 5/1975 | Stout | |
| 3,941,092 A | | 3/1976 | Winters | |
| 4,020,796 A | | 5/1977 | Grifa | |
| 4,407,234 A | * | 10/1983 | Kleman | A01K 13/001 119/672 |
| 4,505,229 A | | 3/1985 | Altissimo | |
| 4,549,502 A | * | 10/1985 | Namdari | A01K 13/001 119/664 |
| 4,930,453 A | * | 6/1990 | Laliberte | A01K 13/001 119/671 |
| 5,632,231 A | * | 5/1997 | Moore | A01K 13/001 119/671 |
| 6,688,257 B2 | | 2/2004 | Lee | |
| D493,259 S | | 7/2004 | Itoiz Oroz | |
| 7,107,937 B1 | | 9/2006 | Anderson | |
| 7,421,978 B2 | | 9/2008 | Price | |
| 7,497,188 B2 | * | 3/2009 | Cho | A01K 13/001 119/604 |
| 8,061,304 B1 | * | 11/2011 | Ramsay | A01K 13/001 119/671 |
| 8,069,821 B1 | | 12/2011 | Green | |
| 8,186,307 B2 | | 5/2012 | Elsayed | |
| 2006/0102096 A1 | * | 5/2006 | Cho | A01K 13/001 119/671 |
| 2006/0102097 A1 | * | 5/2006 | Price | A01K 13/001 119/671 |
| 2007/0289548 A1 | * | 12/2007 | Smoot | A01K 13/001 119/668 |
| 2011/0017147 A1 | * | 1/2011 | Petruzzi | A01K 13/001 119/604 |
| 2017/0094939 A1 | * | 4/2017 | Wright | A01K 13/001 |

* cited by examiner

*Primary Examiner* — Joshua Daniel Huson

(57) ABSTRACT

The dog-washing apparatus is a device that is specially adapted for use with a dog, and which isolates a dog inside of a housing in order to wash said dog. The dog-washing apparatus includes the housing onto which a pair of roof members are hingedly attached. The pair of roof members enclose the housing, and each include at least one glove hole thereon. An entrance into the housing adaptively enables the dog to enter into the housing. A plurality of sprinkler members are positioned inside of the housing and direct a soap and water solution onto the dog. The housing and the pair of roof members are made of a translucent material so as to view the interior of the housing.

11 Claims, 4 Drawing Sheets

DOG-WASHING APPARATUS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of devices for dog washing, more specifically, an apparatus that is adapted to enclose a dog in order to aid in washing of said dog.

SUMMARY OF INVENTION

The dog-washing apparatus is a device that is specially adapted for use with a dog, and which isolates a dog inside of a housing in order to wash said dog. The dog-washing apparatus includes the housing onto which a pair of roof members are hingedly attached. The pair of roof members enclose the housing, and each include at least one glove hole thereon. The at least one glove hole is used in concert with a glove in order for an end user to massage and aid in washing of the dog inside of the housing. An entrance into the housing adaptively enables the dog to enter into the housing. A plurality of sprinkler members are positioned inside of the housing and direct a soap and water solution onto the dog. The bottom of the housing includes a drain mat that diverts dirty water and soap to a drain, which is connected to a flea/tick collection member located outside of the housing. The housing and the pair of roof members are made of a translucent material so as to view the interior of the housing. The housing also includes a slide-in head protector that is adapted to partition the dog's head from the dog's body in order to prevent soap and water from reaching the face of the dog.

These together with additional objects, features and advantages of the dog-washing apparatus will be readily apparent to those of ordinary skill in the art upon reading the following detailed description of the presently preferred, but nonetheless illustrative, embodiments when taken in conjunction with the accompanying drawings.

In this respect, before explaining the current embodiments of the dog-washing apparatus in detail, it is to be understood that the dog-washing apparatus is not limited in its applications to the details of construction and arrangements of the components set forth in the following description or illustration. Those skilled in the art will appreciate that the concept of the disclosure may be readily utilized as a basis for the design of other structures, methods, and systems for carrying out the several purposes of the dog-washing apparatus.

It is therefore important that the claims be regarded as including such equivalent construction insofar as they do not depart from the spirit and scope of the dog-washing apparatus. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
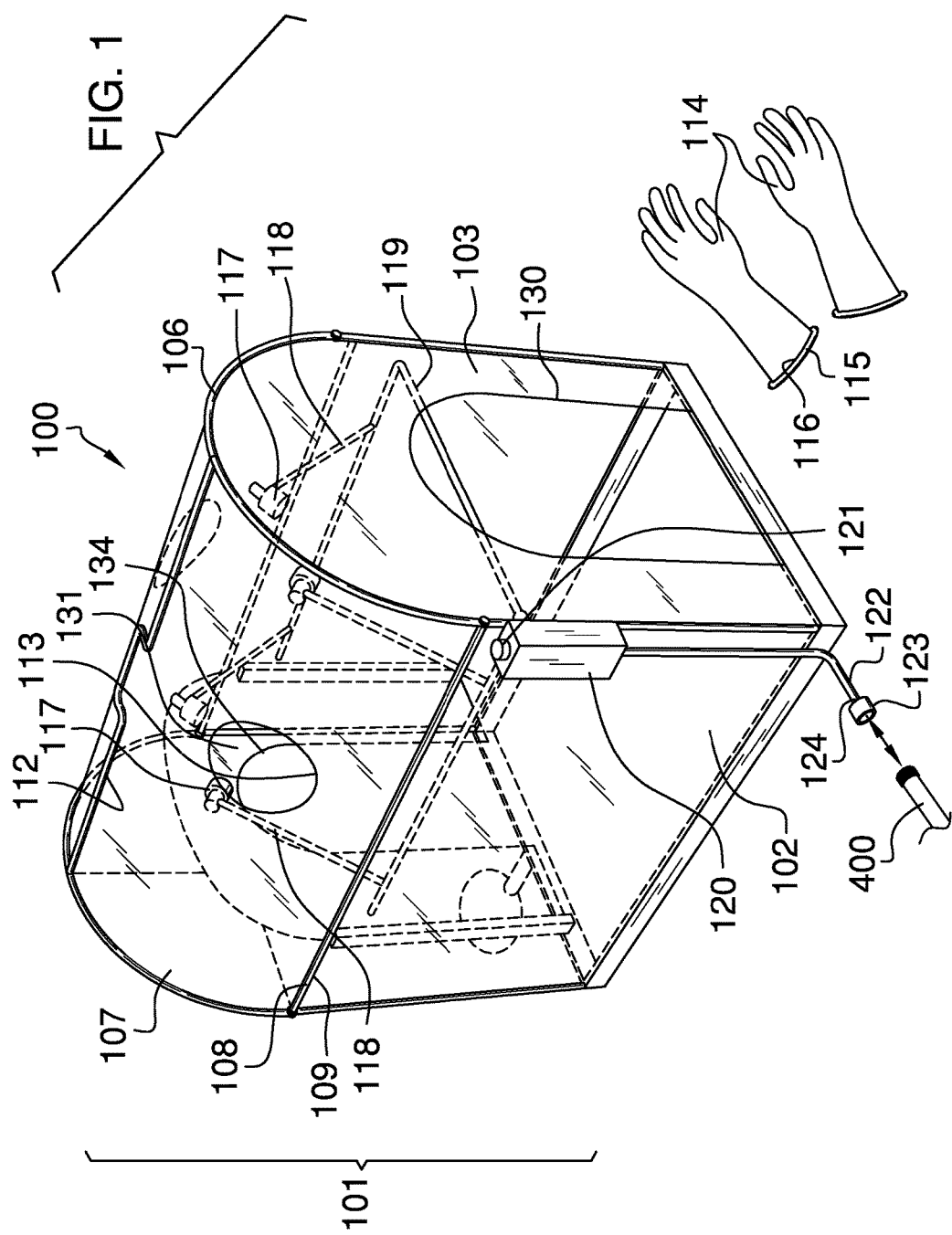
FIG. 1 is a perspective view of an embodiment of the disclosure.
Figure 2:
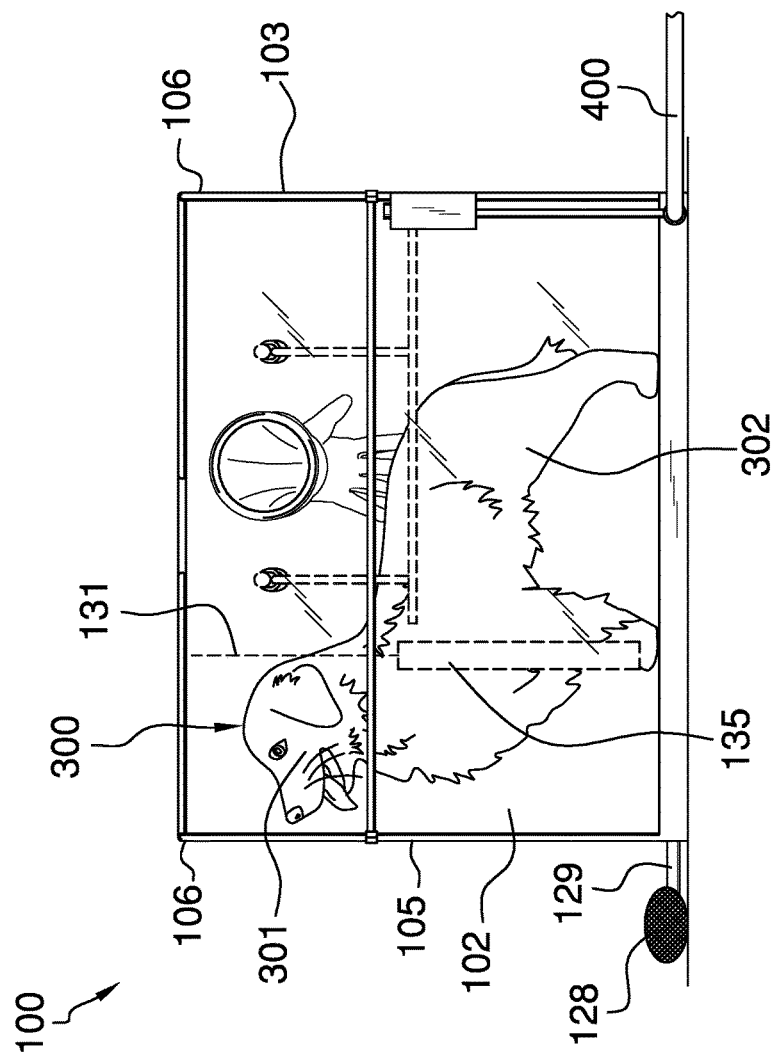
FIG. 2 is a side view of an embodiment of the disclosure in use.
Figure 3:
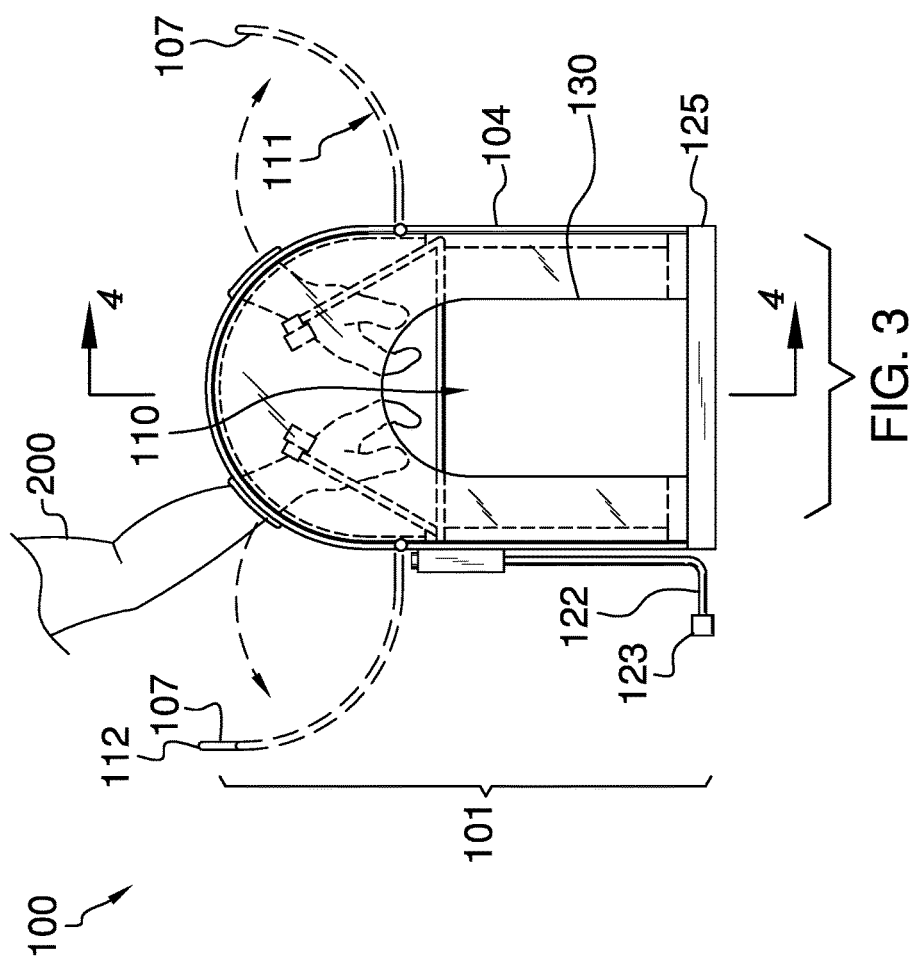
FIG. 3 is an end view of an embodiment of the disclosure.
Figure 4:
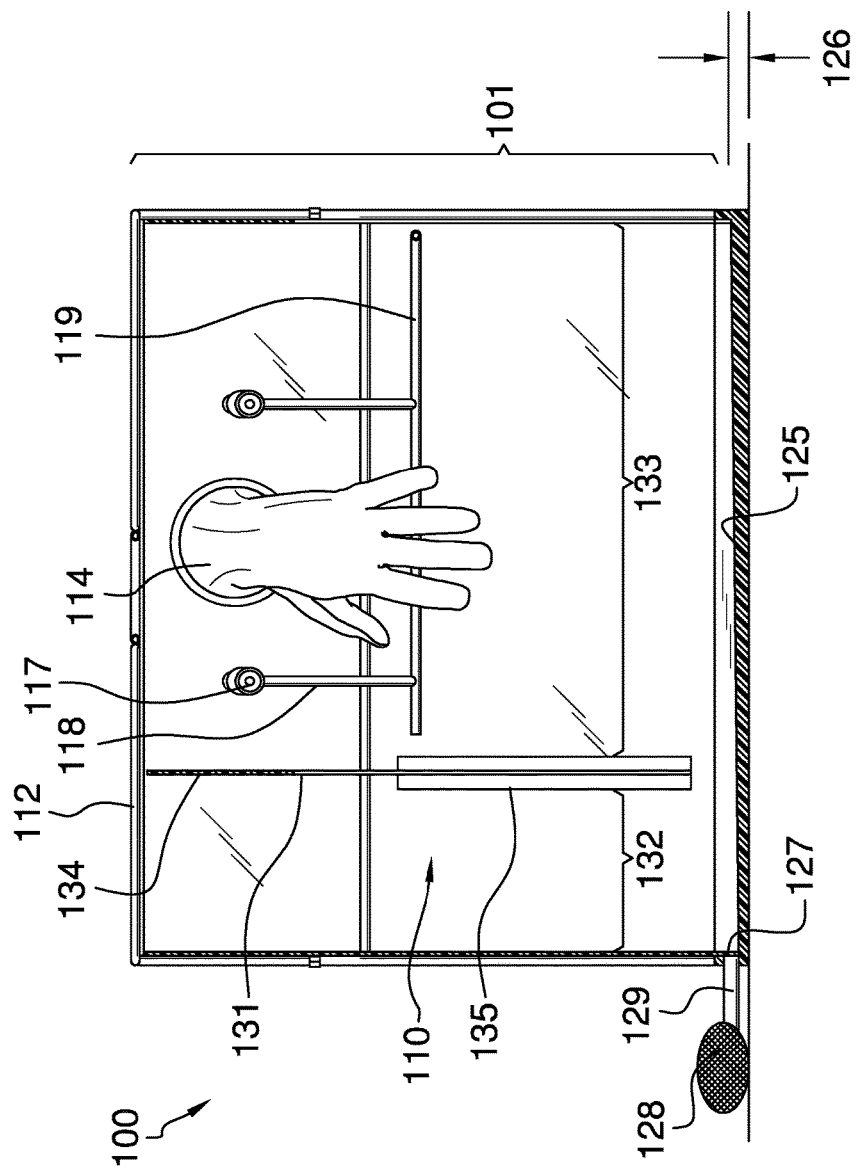
FIG. 4 is a cross-sectional view of an embodiment of the disclosure along line 4-4 in FIG. 3.

Detailed reference will now be made to a first potential embodiment of the disclosure, which is illustrated in FIGS. 1 through 4. The dog-washing apparatus 100 (hereinafter invention) comprises a housing 101 that is further defined with a first side 102, a second side 103, a third side 104, and a fourth side 105. The first side 102 is opposite the third side 104. The second side 103 is opposite the fourth side 105. The second side 103 and the fourth side 105 have a curvilinear shape, and a curved top edge 106.

A pair of roof members 107 is attached via a hinge 108 to a top, lateral side 109 of the first side 102 as well as the third side 104. The pair of roof members 107 rotate outwardly to enable access to an interior 110 of the housing 101. When closed, the pair of roof members 107 and the housing 101 form the overall shape of the invention 100. It shall be noted that the pair of roof members 107 as well as the housing 101 may be of translucent material so as to enable visibility of the interior 110 of the housing 101.

The pair of roof members 107 have a curvature 111 that mimics the curved top edge 106 of the second side 103 and the fourth side 105. The pair of roof members 107 each have a top, roof edge 112 that touches one another when the pair of roof members 107 close off the housing 101. The pair of roof members 107 each have at least one glove hole 113 thereon. The at least one glove hole 113 enables a glove 114 to be attached thereon. The glove 114 includes a ring member 115 on a distal end 116. The ring member 115 of the glove 114 enables a secure connection with the at least one glove hole 113 provided on the pair of roof members 107. The glove 114 is adaptively worn via a user 200 in order to aid in washing a dog 300 inside of the housing 101.

Located on the interior 110 of the housing 101 is a plurality of sprinkler members 117. The plurality of sprinkler members 117 are each directed inwardly with respect to the interior 110 of the housing 101. Moreover, the plurality of sprinkler members 117 each include a first conduit 118 that extends down to a second conduit 119. The second conduit 119 extends to a soap reservoir 120. The soap reservoir 120 connects with a third conduit 122. The third conduit 122 includes a hose coupling 123 on a conduit distal end 124. The hose coupling 123 is able to connected with a garden hose 400 in order to supply fresh water to the invention 100. The soap reservoir 120 includes a removable cap 121 that enables refilling of the soap reservoir 120.

The third conduit 122 is in fluid connection with the soap reservoir 120. The soap reservoir 120 is in fluid connection with the second conduit 119. The second conduit 119 is in fluid connection with the first conduit 118 of each of the plurality of sprinkler members 117. Water supplied via the garden hose 400 is able to mix with the contents of the soap reservoir 120 before dispensing via the plurality of sprinkler members 117.

The housing 101 is further defined with a drain mat 125 that collects all dirty soap and water solution. The drain mat 125 has a decline 126, which feeds dirty soap and water solution to a drain 127 that is in fluid connection with a flea/tick collection member 128. The flea/tick collection member 128 is located outside of the housing 101. The flea/tick collection member 128 is a screen that enables the dirty soap and water solution to exit, but traps in fleas/ticks. A collection member conduit 129 extends between the drain 127 and the flea/tick collection member 128.

The second side 103 of the housing 101 includes an entrance 130 that is adapted to enable the dog 300 to enter and exit the invention 100. The entrance 130 is essentially a curvilinear opening that is provided on the second side 103 of the housing 101. The interior 110 of the housing 101 features a slide-in head protector 131. The slide-in head protector 131 is essentially a partition that separates a second interior 132 from a third interior 133 of the housing 101. Moreover, the second interior 132 and the third interior 133 collectively form the interior 110 of the housing 101. The third interior 133 is adjacent the entrance 130, whereas the second interior 132 is adjacent the drain 127.

The slide-in head protector 131 includes a curvilinear opening 134 that extends upwardly from the drain mat 125. The curvilinear opening 134 is adapted to enable a head portion 301 of the dog 300 to extend across the slide-in head protector 131 whilst a body portion 302 of the dog 300 is situated in the third interior 133 where the plurality of sprinkler members 117 is situated. The slide-in head protector 131 is removable with respect to the housing 101. The housing 101 includes slide brackets 135, which enable the slide-in head protector 131 to be supported inside of the housing 101. The opening of the roof members 107 facilitates insertion and removal of the slide-in head protector 131 with respect to the slide brackets 135 of the housing 101. The slide-in head protector 131 may be translucent along with the housing 101 and the roof members 107.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dog-washing apparatus comprising:
   a housing adapted to enclose a dog in order to wash said dog therein;
   wherein the housing is further defined with a first side, a second side, a third side, and a fourth side;
   wherein the first side is opposite the third side; wherein the second side is opposite the fourth side;
   wherein the second side and the fourth side have a curvilinear shape, and a curved top edge;
   wherein a pair of roof members is attached via a hinge to a top, lateral side of the first side as well as the third side;
   wherein the pair of roof members rotate outwardly to enable access to an interior of the housing;
   wherein the pair of roof members as well as the housing are constructed of translucent material so as to enable visibility of the interior of the housing;
   wherein the pair of roof members have a curvature that mimics the curved top edge of the second side and the fourth side;
   wherein the pair of roof members each have a top, roof edge that touches one another when the pair of roof members close off access to the interior of the housing;
   wherein the pair of roof members each have at least one glove hole thereon;
   wherein the at least one glove hole enables a glove to be attached thereon;
   wherein the glove includes a ring member on a distal end;
   wherein the ring member of the glove enables a secure connection with the at least one glove hole provided on the pair of roof members;
   wherein the glove is adaptively worn via a user in order to aid in washing a dog inside of the housing;
   wherein located on the interior of the housing is a spray assembly comprising:
      a plurality of sprinkler members and a horizontal second conduit extending along the interior perimeter of the housing at a location below the roof hinge;
      wherein each of the plurality of sprinkler members further comprises
         a spray head, and
         a vertically extending first conduit wherein said spray head is attached to a top end of said first conduit at a height above the top of the first and third sides of the housing but below the curved top edge of the second and fourth sides and wherein a bottom end of each of said first conduit is in fluid communication with said horizontal second conduit at a location adjacent said first or third wall and below said roof hinge, such that water exiting the spray head is directed downwardly and inwardly with respect to the interior of the housing;
   wherein the second conduit extends to a soap reservoir.

2. The dog-washing apparatus according to claim 1 wherein the soap reservoir connects with a third conduit; wherein the third conduit includes a hose coupling on a conduit distal end; wherein the hose coupling is able to connected with a garden hose in order to supply fresh water.

3. The dog-washing apparatus according to claim 2 wherein the soap reservoir includes a removable cap that enables refilling of the soap reservoir.

4. The dog-washing apparatus according to claim 3 wherein the third conduit is in fluid connection with the soap reservoir; wherein the soap reservoir is in fluid connection with the second conduit.

5. The dog-washing apparatus according to claim 4 wherein the second conduit is in fluid connection with the first conduit of each of the plurality of sprinkler members; wherein water supplied via the garden hose is able to mix with the contents of the soap reservoir before dispensing via the plurality of sprinkler members.

6. The dog-washing apparatus according to claim 5 wherein the housing is further defined with a drain mat that collects all dirty soap and water solution; wherein the drain mat has a decline, which feeds dirty soap and water solution to a drain that is in fluid connection with a flea/tick collection member; wherein the flea/tick collection member is located outside of the housing.

7. The dog-washing apparatus according to claim 6 wherein the flea/tick collection member is a screen that enables the dirty soap and water solution to exit, but traps in fleas/ticks; wherein a collection member conduit extends between the drain and the flea/tick collection member.

8. The dog-washing apparatus according to claim 7 wherein the second side of the housing includes an entrance that is adapted to enable the dog to enter and exit the housing; wherein the entrance is essentially a curvilinear opening that is provided on the second side of the housing.

9. The dog-washing apparatus according to claim 8 wherein the interior of the housing features a slide-in head protector; wherein the slide-in head protector is a partition that separates a second interior from a third interior of the housing; wherein the second interior and the third interior collectively form the interior of the housing; wherein the third interior is adjacent the entrance, whereas the second interior is adjacent the drain.

10. The dog-washing apparatus according to claim 9 wherein the slide-in head protector includes a curvilinear opening that extends upwardly from the drain mat; wherein the curvilinear opening is adapted to enable a head portion of the dog to extend across the slide-in head protector whilst a body portion of the dog is situated in the third interior where the plurality of sprinkler members is situated.

11. The dog-washing apparatus according to claim 10 wherein the slide-in head protector is removable with respect to the housing; wherein the housing includes slide brackets, which enable the slide-in head protector to be supported inside of the housing; where upon opening of the roof members facilitates insertion and removal of the slide-in head protector with respect to the slide brackets of the housing; wherein the slide-in head protector is of translucent construction.

\* \* \* \* \*